Oct. 18, 1927.

M. H. BROWN

CAP FOR HORSE COLLARS

Filed June 18, 1926

1,646,051

Inventor
Maurice H. Brown
By
Attorney

Patented Oct. 18, 1927.

1,646,051

UNITED STATES PATENT OFFICE.

MAURICE H. BROWN, OF NORTH BALTIMORE, OHIO.

CAP FOR HORSE COLLARS.

Application filed June 18, 1926. Serial No. 116,840.

My invention has for its object to provide a cap which is so constructed that it will maintain its conformation to the shape of that portion of the horse's neck on which it rests notwithstanding its long and continuous use and will not flatten to cause the end edges of the cap to engage with the horse and cause chafing. The invention also provides a form of cap wherein the attaching rivets, commonly used in connection with such caps for securing the parts in position, and, particularly, for securing the cap to parts of the collar, will be permanently maintained at a point remote from the body of the horse and thus prevent all possible irritation that might otherwise be produced.

The invention may be contained in caps that may be varied in their details of construction and to illustrate a practical application of the invention I have selected a horse collar cap that contains my invention as an example of such structures and shall describe it hereinafter. The cap selected is shown in the accompanying drawings.

Figure 1:
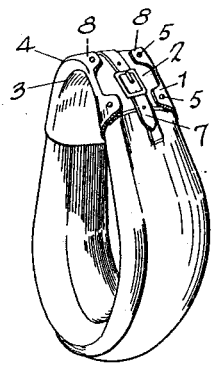
Figure 2:
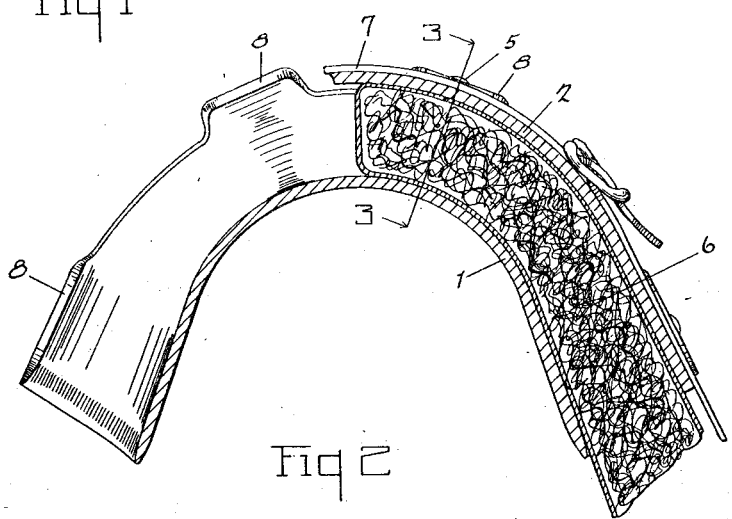
Figure 3:
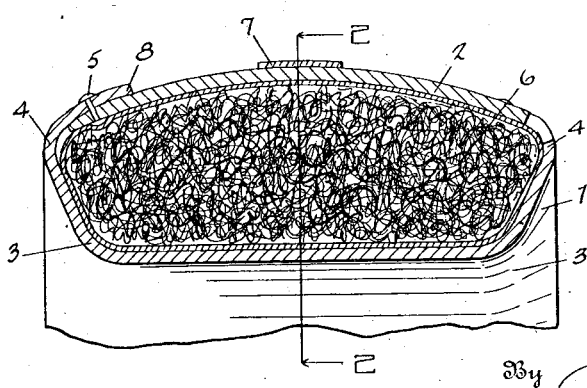

Figure 1 illustrates a view of a horse collar wherein the protective cap is used. Fig. 2 is a view of a longitudinal section through a part of the horse collar and cap, a part of the cap being shown broken away to illustrate more in detail a part of the structure of the cap. The section is taken on the plane of the line 2—2 indicated in Fig. 3. Fig. 3 is a view of a transverse section taken on the line 3—3 indicated in Fig. 2.

The cap may be formed of leather, zinc or other suitable material. The cap shown in the drawings is formed of leather 1 and 2. It is bent to conform to the shape of the horse at the point where the collar is supported on the horse's body. It is provided with the curved parts 3 and 4 at the rear and forward sides of the collar. The curved portion 3 particularly prevents abrasion or irritation due to movement of the collar relative to the portion of the horse's body on which the collar rests. Collar caps are usually provided with curved forward and rear portions for this purpose but in the use of such caps the curved portions straighten out with the result that the forward and rear edges are brought into contact with the body of the horse and movement of the collar causes it to penetrate and chafe the flesh which produces sores of different kinds and which are difficult to heal, particularly, where the horse continues to work and the collar is used. By my invention, I have provided a means whereby the curved forward and rear portions of the cap will be maintained and also whereby, in the use of the cap, it will be made to conform with increasing exactness, the configuration of that portion of the horse on which the collar is placed.

In the construction shown in the drawing the cap has not only the upper curved portions 3, but also the inwardly curved portions 4 which prevent flattening of the cap to the extent that the forward and rear edges of the cap will engage the body of the horse as the cap "settles" that is, conforms to the shape of the horse. The inwardly extending edges of the cap will be brought closer to the central portion of the cap where it rests on the horse's body and contact of the edges of the cap with the horse will be prevented. In order to insure the inturned relation of the edge portions of the cap, they may be connected together by a suitable means, this will prevent them from flaring outward and will prevent them from interfering with the connection of the other parts of the harness, viz, the hames, the pad, etc.

The inwardly turned edges afford a means whereby the edges may be secured to the collar at some point. In the form of construction shown in the drawings, the edge portions of the part 1 of the cap are connected by means of the leather piece 2. The leather piece 2 preferably extends the length of the cap. The edge portions of the leather parts 1 and 2 are secured together by means of the rivets 5. The parts 1 and 2 thus form a leather shell which will conform to the shape of the horse's neck with increasing exactness as the cap is worn, and moreover provides an attractive means for the protection of the horse as against the wear of the collar. The ends of the pad 6 may be inserted into the shell formed by the parts 1 and 2 that make up the cap and the pad may be secured by a suitable strap 7 in the manner well known in the art. The hames may be also placed in position, the straps or connecting parts of the hames extending over the cap and, resting on the piece 2.

In the preferred form of construction, the edge portions of the piece 1 of the cap is provided with tongues 8 that extend inwardly and the rivets 5 are located in the tongues. This produces a greater flexibility of the edge portions of the part 1 of the cap. Where the edge portions are connected together by the piece 2, cutting away the edge portions to form the tongues 8 enables the cap as a whole to more readily conform to the exact shape of the horse in the use of the collar.

I claim:

In a horse collar cap, a leather part having curved upwardly extending portions and curved inward edge portions, the edges extending substantially towards each other, the said leather part having tongues protruding from its edges, a second leather part, the edge portions of the said second part being connected to the said tongues.

In testimony whereof I have hereunto signed my name to this specification.

MAURICE H. BROWN.